United States Patent
Erickson et al.

(10) Patent No.: US 11,260,354 B2
(45) Date of Patent: Mar. 1, 2022

(54) APPARATUS, SYSTEM, AND METHOD FOR PRODUCING A SEALANT

(71) Applicant: The Boeing Company, Chicago, IL (US)

(72) Inventors: Jeffrey Erickson, Lakewood, WA (US); Sarah Dickerson, Bothell, WA (US); Nelson N. Akwari, Summerville, SC (US); John DeForest, Bothell, WA (US)

(73) Assignee: The Boeing Company, Chicago, IL (US)

( * ) Notice: Subject to any disclaimer, the term of this patent is extended or adjusted under 35 U.S.C. 154(b) by 369 days.

(21) Appl. No.: 15/371,043

(22) Filed: Dec. 6, 2016

(65) Prior Publication Data

US 2018/0154322 A1    Jun. 7, 2018

(51) Int. Cl.
| | |
|---|---|
| *B01F 3/08* | (2006.01) |
| *B01F 15/00* | (2006.01) |
| *B05D 3/06* | (2006.01) |
| *B01F 15/04* | (2006.01) |
| *B01F 3/10* | (2006.01) |
| *B05C 9/10* | (2006.01) |
| *C09K 3/10* | (2006.01) |

(52) U.S. Cl.
CPC .......... *B01F 15/0408* (2013.01); *B01F 3/088* (2013.01); *B01F 3/10* (2013.01); *B01F 15/00214* (2013.01); *B05C 9/10* (2013.01); *B05D 3/068* (2013.01); *C09K 3/10* (2013.01)

(58) Field of Classification Search
CPC ...... B01F 5/0408; B01F 5/04; B01F 5/00214; B05F 15/00214; B05F 15/0022; B05F 15/00259; B05F 15/00272; B05F 15/00285; Y10T 436/13; G01N 23/223
See application file for complete search history.

(56) References Cited

U.S. PATENT DOCUMENTS

| | | | | |
|---|---|---|---|---|
| 3,223,040 A * | 12/1965 | Dinkelkamp | ........ | G05D 11/132 417/3 |
| 4,378,442 A * | 3/1983 | Marsh | ........ | C08K 5/0025 502/170 |
| 5,107,527 A * | 4/1992 | Sipila | ........ | G01N 23/20083 378/46 |
| 6,037,180 A * | 3/2000 | Yorkgitis | ........ | G01N 27/72 436/56 |
| 8,651,046 B1 | 2/2014 | Davancens et al. | | |
| 9,095,872 B2 | 8/2015 | Topf et al. | | |
| 2004/0005411 A1 | 1/2004 | Hubert | | |
| 2006/0243382 A1* | 11/2006 | Kilwin | ........ | B29C 65/544 156/285 |
| 2007/0134748 A1* | 6/2007 | Kudo | ........ | G01N 33/552 435/7.92 |
| 2013/0112624 A1* | 5/2013 | Gebauer | ........ | B01D 15/12 210/656 |
| 2014/0220334 A1 | 8/2014 | Takayuki | | |
| 2015/0044369 A1 | 2/2015 | Keener et al. | | |
| 2015/0086706 A1 | 3/2015 | Guzowski | | |
| 2015/0343487 A1 | 12/2015 | Davancens et al. | | |
| 2016/0060484 A1* | 3/2016 | Cai | ........ | C08K 5/49 427/386 |

FOREIGN PATENT DOCUMENTS

| | | |
|---|---|---|
| JP | 2000162207 | 6/2000 |
| JP | 2010022908 | 2/2010 |

OTHER PUBLICATIONS

Fenzi, Valuation of the Mixing Ratio in Polysulphide Sealants: The X-Ray Fluorescence Method, https://www.fenzigroup.com/en/la-valutazione_en, Retrieved on Apr. 23, 2020, Uploaded Jul. 25, 2005 (Year: 2005).*
Bruker (Process Control, https://www.bruker.com/applications/quality-control/process-control.html, Retrieved on Oct. 10, 2020; Available Online Oct. 29, 2015; Bruker) (Year: 2015).*
Milne, S. (Continuous Fully Automated On-Line XRF Analysis; https://www.azom.com/article.aspx?ArticleID=13304; Retrieved on Oct. 10, 2020; Available Online on Nov. 11, 2016; Milne) (Year: 2016).*
D'Emanuele, Gianluca, Evaluating Mixing Ratio in I.G. Polysulfide Sealants via X-Rays Fluorescence Analysis Method, pp. 1-9, FENZI S.p.A., 2014.
Valuation of the Mixing Ratio in Polysulphide Sealants: the x-ray fluorescence method, Fenzi Group SpA Newsletter, pp. 1-4, http://www.fenzigroup.com/en/la-valutazione_en accessed Dec. 6, 2016.
Extended European Search Report for EP Patent Application No. 17198670.6 dated Apr. 11, 2018.
Chinese Office Action concerning CN Patent Application No. 2017110826219 dated Jun. 23, 2021.
Valuation of the Mixing Ratio in Polysulphide Sealants: The X-Ray Flourescence Method, Fenzi Group SpA, Newsletter Mar. 2019.
Japanese Office Action concerning JP Patent Application No. 2017232466 dated Nov. 24, 2021.

* cited by examiner

*Primary Examiner* — Francisco W Tschen
(74) *Attorney, Agent, or Firm* — Kunzler Bean & Adamson (57) ABSTRACT

Described herein is a method for producing a sealant. The method includes mixing a first material with a second material at a manufacturing site to produce the sealant. The method also includes applying x-ray energy to the sealant at the manufacturing site. The method includes measuring an amount of fluorescence emitted from the sealant in response to applying the x-ray energy. The method also includes calculating a mix ratio of the first and second materials of the sealant based on the amount of fluorescence. The method includes determining whether the mix ratio is within a predetermined mix ratio range.

20 Claims, 7 Drawing Sheets

APPARATUS, SYSTEM, AND METHOD FOR PRODUCING A SEALANT

FIELD

This disclosure relates generally to manufacturing, and more particularly to producing a sealant for manufacturing.

BACKGROUND

A pre-produced sealant may be a curable sealant wherein one or more base sealants and one or more accelerators are pre-mixed and pre-packaged prior to application or use. In certain environments, a pre-produced sealant may be used during manufacturing. Such a pre-produced sealant may be created at location off-site relative to or remote from a manufacturing site where the sealant is applied to a part. Generally, after the pre-produced sealant is created, it is preserved in a frozen state and transported to the manufacturing site where it can be thawed and applied to a part. The pre-produced sealant may include suitable chemical properties for a particular application, without the need to add to or mix in additional materials. However, the chemical composition of pre-produced sealant is difficult to modify should it be desirable to use the pre-produced sealant in an application different than what the pre-produced sealant was intended for.

Pre-produced sealant can be time-consuming and expensive to use. For example, in order to inhibit premature cure the pre-produced sealant must be stored in a container in a freezer and thawed prior to use. Furthermore, the container may be disproportionately small or large as compared to an amount of pre-produced sealant used during manufacturing. Accordingly, application of the pre-produced sealant to a part may require multiple installations of new pre-produced sealant containers and removal of old empty pre-produced sealant containers. For smaller applications, unused thawed material can no longer be stored and must be disposed.

SUMMARY

The subject matter of the present application has been developed in response to the present state of the art, and in particular, in response to shortcomings of conventional sealant production. For example, conventional sealant production techniques do not facilitate easy to use sealant that has a proper and adjustable composition and that can be used in a time efficient manner.

Accordingly, the subject matter of the present application has been developed to provide a sealant production apparatus, system, and method that overcome at least some of the above-discussed shortcomings of prior art techniques. More particularly, in some embodiments, described herein are apparatuses, systems, and methods for sealant production that mix materials at a manufacturing site and test a mix ratio of the materials at the manufacturing site.

According to one embodiment, a method includes mixing a first material with a second material at a manufacturing site to produce a sealant. The method also includes applying x-ray energy to the sealant at the manufacturing site. The method includes measuring an amount of fluorescence emitted from the sealant in response to applying the x-ray energy. The method also includes calculating a mix ratio of the first and second materials of the sealant based on the amount of fluorescence. The method includes determining whether the mix ratio is within a predetermined mix ratio range.

In another embodiment, the method includes applying the sealant, using robotic application, to a part at the manufacturing site.

In certain implementations, the first material includes a base, the second material includes an accelerator, and the accelerator includes a fluorescing compound.

In some implementations, applying the x-ray energy to the sealant at the manufacturing site further includes applying the x-ray energy to a separated portion of the sealant.

In various implementations, applying the x-ray energy to the sealant at the manufacturing site further includes applying the x-ray energy to an unseparated portion of the sealant.

In yet another embodiment, the method includes adjusting the mix ratio in response to the mix ratio being outside the predetermined mix ratio range.

According to one implementation of the method, calculating the mix ratio of the first and second materials of the sealant based on the amount of fluorescence further includes calculating the mix ratio by comparing the amount of fluorescence to a calibration curve.

In another embodiment, the method includes modifying operation of robotic application of the sealant in response to the mix ratio being outside the predetermined mix ratio range.

According to some embodiments, a manufacturing system of producing a sealant includes a mixing device configured to mix a first material with a second material to produce a sealant. The manufacturing system also includes an x-ray device configured to apply x-ray energy to the sealant. The manufacturing system includes a meter configured to measure an amount of fluorescence emitted from the sealant in response to the x-ray energy applied to the sealant. The manufacturing system also includes a robot having an end effector configured to apply the sealant to a part. The manufacturing system includes a controller configured to calculate a mix ratio of the first and second materials of the sealant based on the amount of fluorescence and determine whether the mix ratio is within a predetermined mix ratio range.

In certain implementations, the controller is configured to inhibit operation of the robot in response to the mix ratio being outside the predetermined mix ratio range.

In some implementations, the controller is configured to adjust the mix ratio in response to the mix ratio being outside the predetermined mix ratio range.

In various implementations, the manufacturing system includes a first container configured to hold the first material, and a second container configured to hold the second material.

In yet another embodiment, the manufacturing system includes a first pump configured to pump the first material from the first container to the mixing device, and a second pump configured to pump the second material from the second container to the mixing device.

In another embodiment, the manufacturing system includes a platform. The mixing device, the x-ray device, the meter, and the robot are mounted to the platform, and the platform is movable relative to the part.

In certain implementations, the first material includes a base and the second material includes an accelerator.

In some implementations, the accelerator includes a fluorescing compound.

In various implementations, the controller is configured to calculate the mix ratio by comparing the amount of fluorescence to a calibration curve.

According to certain embodiments, a controller that controls producing a sealant includes a mixing module that mixes a first material with a second material at a manufacturing site to produce a sealant. The controller also includes a detection module that measures an amount of fluorescence emitted from the sealant in response to applying x-ray energy to the sealant at the manufacturing site. The controller includes a calculation module that calculates a mix ratio of the first and second materials of the sealant based on the amount of fluorescence. The controller also includes a robot control module that inhibits operation of a robot in response to the mix ratio being outside of a predetermined mix ratio range.

In certain implementations, the calculation module calculates the mix ratio by comparing the amount of fluorescence to a calibration curve, and the calibration curve corresponds to the first and second materials.

In various implementations, the calibration curve varies based on a lot number corresponding to the first and second materials.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter, they are not therefore to be considered to be limiting of its scope. The subject matter will be described and explained with additional specificity and detail through the use of the drawings, in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Figure 1:
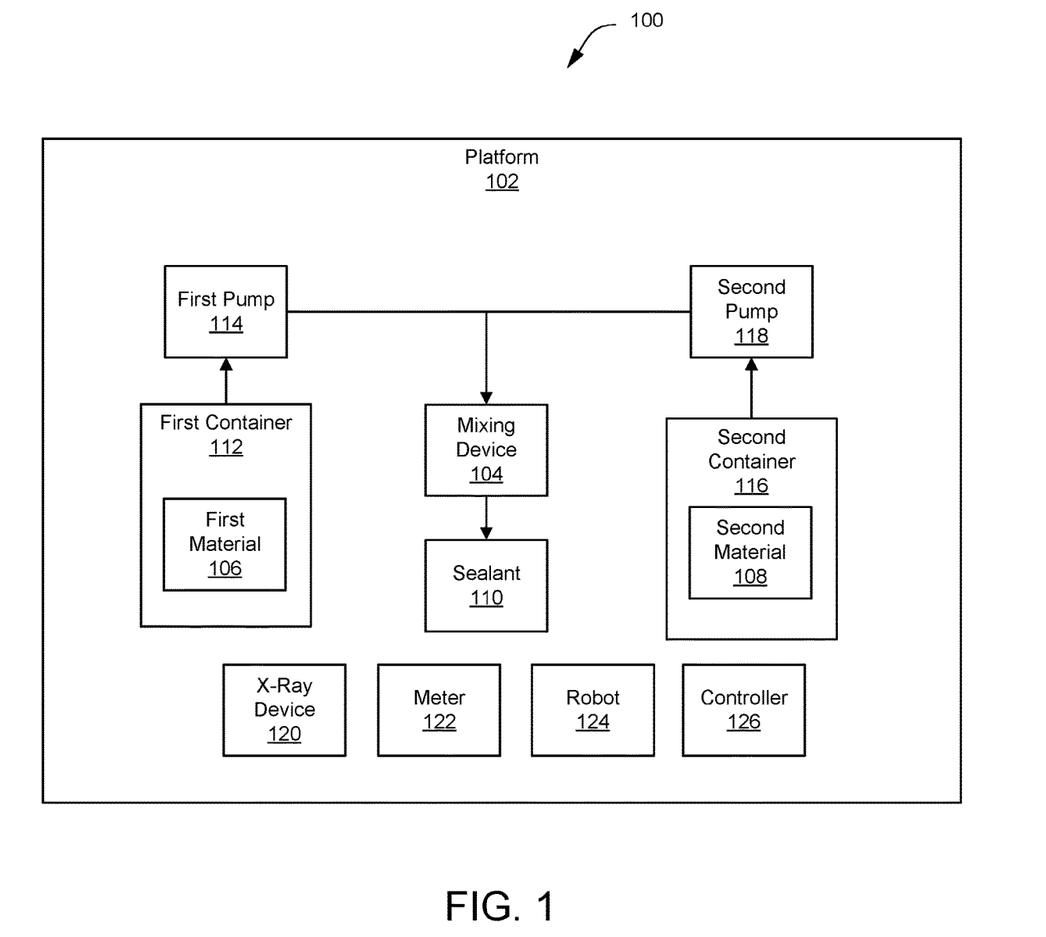
FIG. 1 is a schematic diagram of one embodiment of a system for producing a sealant.

FIG. 1 is a schematic diagram of one embodiment of a system 100 for producing a sealant 110. In some embodiments, the system 100 is located at a manufacturing site or manufacturing cell (e.g., one location). The system 100 includes a platform 102 (e.g., manufacturing platform) that has multiple devices coupled thereon for manufacturing. In various embodiments, the platform 102 is movable relative to a part being manufactured.

Specifically, as illustrated in FIG. 1, the platform 102 includes a mixing device 104 configured to mix a first material 106 with a second material 108 to produce the sealant 110. In one embodiment, the first material 106 includes one or more bases and the second material 108 includes one or more accelerators. Moreover, in various embodiments, the accelerator includes a metal compound, or another component, that will fluoresce upon application of an x-ray. The metal compound includes manganese, in certain embodiments. In some embodiments, the accelerator includes a doping agent that may substantially be used to fluoresce upon application of an x-ray to indicate a mix ratio of the first material 106 and the second material 108. As defined herein, a sealant can be any of various substances formed by mixing together any of at least two materials. Accordingly, in some embodiments, the first and second materials 106 and 108 are any suitable materials.

The platform 102 includes a first container 112 configured to hold the first material 106. In one embodiment, the first container 112 is configured to hold 1 to 60 gallons of the first material 106. In certain embodiments, the first container 112 is configured to hold less than 1 gallon or greater than 60 gallons of the first material 106. For example, in one embodiment, the first container 112 is configured to hold approximately 55 gallons of the first material 106. The platform 102 also includes a first pump 114 configured to pump the first material 106 from the first container 112 to the mixing device 104. In some embodiments, the platform 102 includes the first container 112, but also includes the first pump 114 and/or a conduit that directs the first material 106 from the first pump 114 to the mixing device 104.

Furthermore, the platform 102 includes a second container 116 configured to hold the second material 108. In one embodiment, the second container 116 is configured to hold 1 to 60 gallons of the second material 108. In certain embodiments, the second container 116 is configured to hold less than 1 gallon or greater than 60 gallons of the second material 108. For example, in one embodiment, the second container 116 is configured to hold approximately 5 gallons of the second material 108. The platform 102 also includes a second pump 118 configured to pump the second material 108 from the second container 116 to the mixing device 104. In some embodiments, the platform 102 does not include the second container 116, but includes the second pump 118 and/or a conduit that directs the second material 108 from the second pump 118 to the mixing device 104.

The platform 102 includes an x-ray device 120 configured to apply x-ray energy to the sealant 110 to determine a mix ratio of the first and second materials of the sealant 110. The x-ray device 120 may be any suitable x-ray device capable of applying x-ray energy. After applying the x-ray energy to the sealant 110, the sealant 110 emits fluorescence. In some embodiments, the fluorescence is emitted in response to manganese, or another fluorescing material, being in the accelerator of the sealant 110. According to other embodiments, the florescence is emitted in response to another similar or analogous material in the sealant.

The platform 102 includes a meter 122 configured to measure an amount of fluorescence emitted from the sealant 110 in response to the x-ray energy being applied to the sealant 110. The meter 122 may be any suitable meter capable of detecting fluorescence, such as, for example, a fluorometer. The platform 102 also includes a robot 124 configured to apply the sealant 110 to a part. In some embodiments, the robot 124 includes an end effector that applies the sealant 110 to the part.

The platform 102 includes a controller 126 configured to calculate a mix ratio of the first and second materials of the sealant based on the amount of fluorescence and determine whether the mix ratio is within a predetermined mix ratio range (e.g., a mix ratio setting, a quality assurance mix ratio range, etc.). In some embodiments, the controller 126 is configured to inhibit operation of the robot 124 (e.g., shut off the robot 124) in response to the mix ratio being outside the predetermined mix ratio range (e.g., greater than an upper bound, less than a lower bound, etc.). In other embodiments, the controller 126 is configured to adjust the mix ratio in response to the mix ratio being outside the predetermined mix ratio range. For example, the controller 126 may increase an amount of the first material 106 per unit of measurement of the sealant 110, decrease an amount of the first material 106 per unit of measurement of the sealant 110, increase an amount of the second material 108 per unit of measurement of the sealant 110, and/or decrease an amount of the second material 108 per unit of measurement of the sealant 110. In one embodiment, the controller 126 is configured to calculate the mix ratio by comparing the amount of fluorescence to a calibration curve. In such an embodiment, the calibration curve corresponds to the first material 106 and/or the second material 108. As may be appreciated, the calibration curve may vary based on a lot number (e.g., pre-set or pre-determined characteristics of a particular lot or batch) of the first material 106 and/or the second material 108. For example, the calibration curve may vary based on a lot number of the first material 106. As another example, the calibration curve may vary based on a lot number of the second material 108. As a further example, the calibration curve may vary based on a lot number of a unique grouping of the first material 106 and the second material 108. As used herein, "lot number" may refer to any designation used to refer to a group of one or more materials (e.g., a number, a color, a code, a symbol, a name, etc.).

Figure 2:
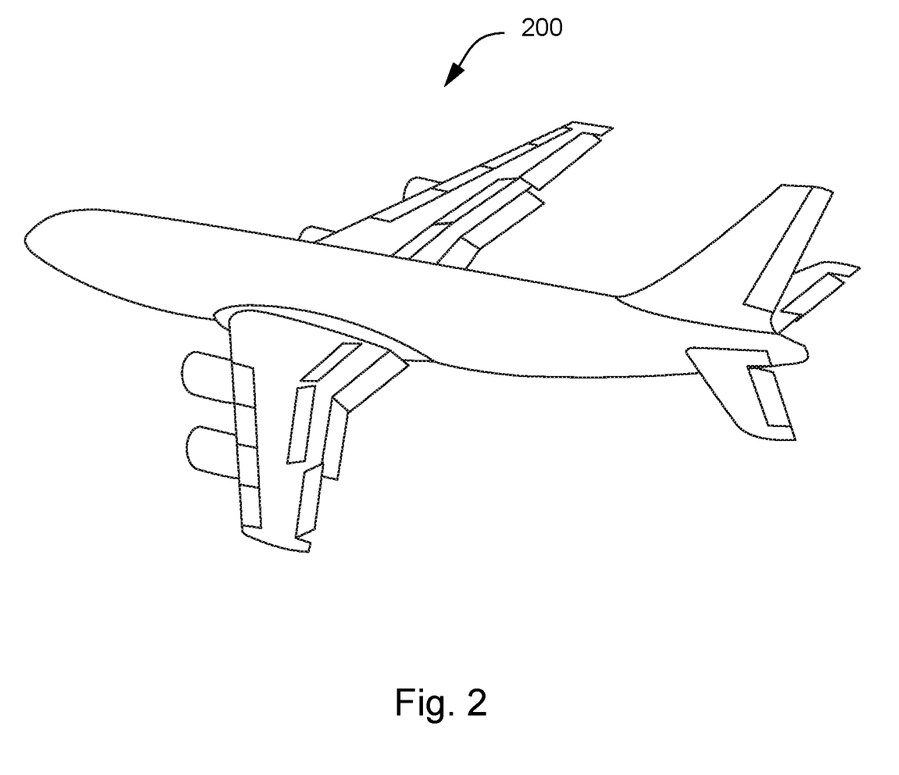
FIG. 2 is a schematic illustration of one embodiment of a system including parts produced using a sealant.

FIG. 2 is a schematic illustration of one embodiment of a system 200 including parts produced using the sealant 110. As illustrated, aircraft parts may be produced using the sealant 110. Moreover, any suitable parts may be manufactured using the sealant 110. For example, aircraft parts, motor vehicle parts, structural parts, satellite parts, space vehicle parts, metallic parts, electronic parts, and so forth may be manufactured using the sealant 110.

Figure 3:
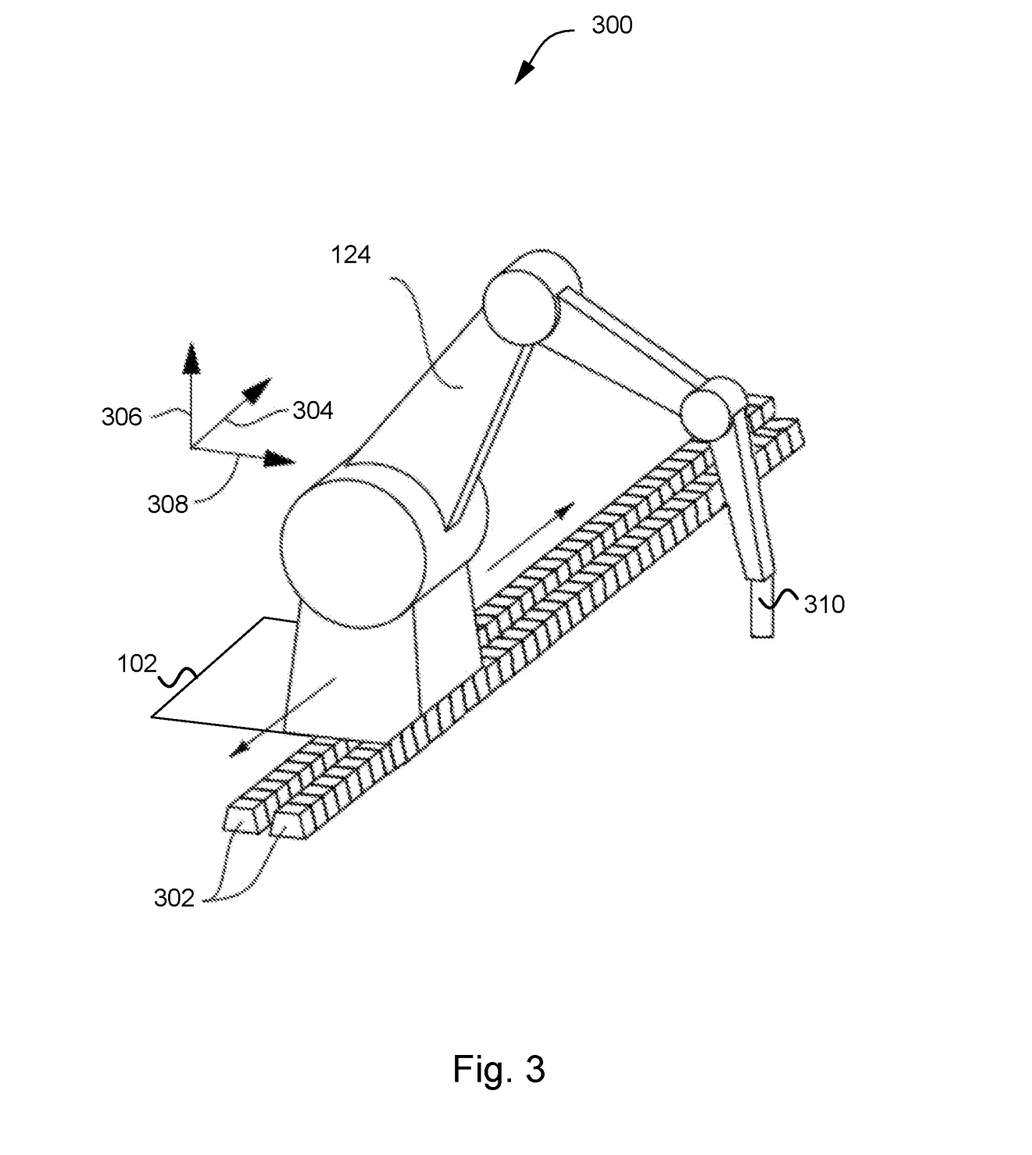
FIG. 3 is a schematic illustration of one embodiment of a system for producing a sealant.

FIG. 3 is a schematic illustration of one embodiment of a system 300 for producing the sealant 110. The system 300 includes the platform 102 having the robot 124. The platform 102 is configured to move along rails 302 parallel to a first direction 304 to facilitate application of the sealant 110 to parts being manufactured. The robot 124 extends (e.g., vertically or upright) from the rails 302 in a direction substantially parallel to a second direction 306. Moreover, an arm of the robot 124 extends away from the rails 302 (e.g., perpendicular to the rails 302 in a third direction 308). As illustrated, the robot 124 includes an end effector 310 to apply sealant 110 to the parts being manufactured.

Figure 4:
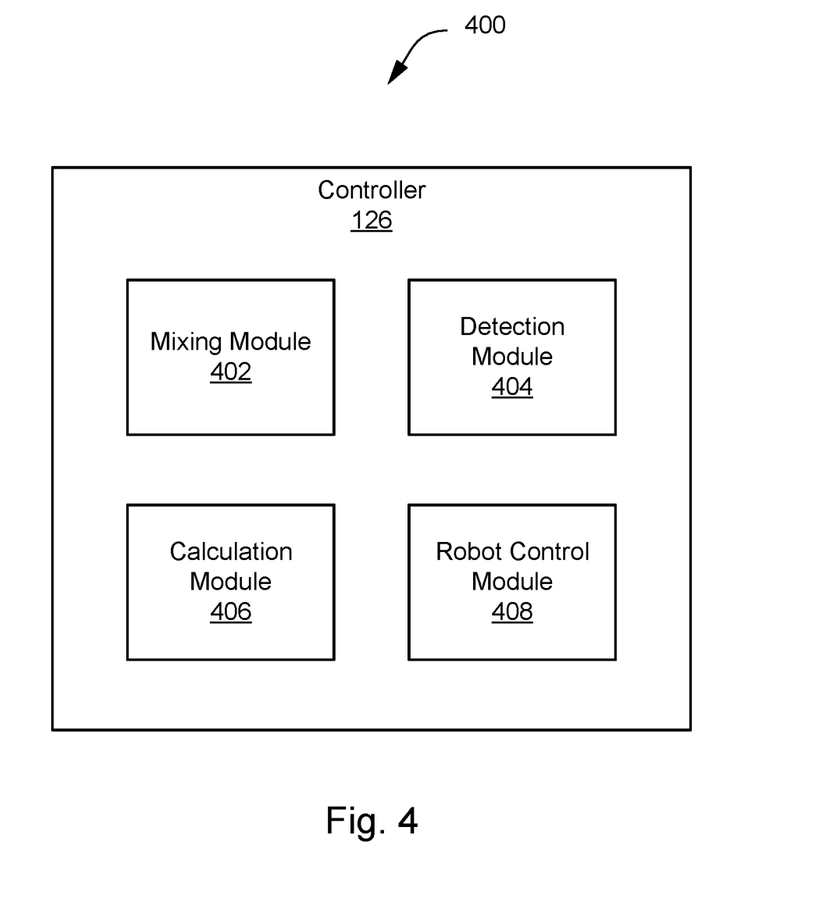
FIG. 4 is a schematic block diagram of one embodiment of a controller for controlling production of a sealant.

FIG. 4 is a schematic block diagram of one embodiment of the controller 126 for controlling production of the sealant 110. The controller 126 includes a mixing module 402, a detection module 404, a calculation module 406, and a robot control module 408.

In some embodiments, the mixing module 402 controls mixing of the first material 106 with the second material 108 at a manufacturing site to produce the sealant 110. The mixing module 402 controls mixing devices and components (e.g., pumps and mixers) to mix a first quantity of the first material 106 with a second quantity of the second material 108. For example, in one embodiment, a ratio of the first quantity to the second quantity is 10:1. As another example, in one embodiment, a ratio of the first quantity to the second quantity is 4:3. As may be appreciated, the ratio of the first quantity to the second quantity may be any suitable ratio. In one implementation, the ratio is determined based on specifications corresponding to the first material 106 and the second material 108. In certain embodiments, the ratio is selected by an operator based on any of various factors, such as a desired sealant viscosity, adhesion or strength, or cost. In some embodiments, the ratio is preset and adjusted based on testing of the sealant 110 produced by the preset ratio. In various embodiments, the ratio is set based on a calibration curve corresponding to the first material 106 and/or the second material 108. The controller 126 controls a change to the ratio in real-time during operation, according to some implementations.

In certain embodiments, the detection module 404 provides measurement of an amount of fluorescence emitted from the sealant 110 in response to applying x-ray energy to the sealant 110 at the manufacturing site. In some embodiments, the detection module 404 may apply the x-ray energy to the sealant 110 at the manufacturing site. In various embodiments, the calculation module 406 calculates a mix ratio of the first and second materials of the sealant 110 based on the amount of fluorescence detected, for example, as measured by the detection module 404. The calculation module 406, in some embodiments, compares an amount of x-ray energy applied to the sealant 110 with the amount of fluorescence emitted from the sealant 110 as part of the calculation of the mix ratio. In some embodiments, the calculation module 406 further calculates the mix ratio by comparing the amount of fluorescence to a calibration curve. The calibration curve corresponds to the first material 106 and/or the second material 108 in certain implementations. In certain embodiments, the calibration curve varies based on a lot number of the first material 106 and/or the second material 108. In some embodiments, the calibration curve varies based on a lot number corresponding to a unique grouping of the first material 106 and the second material 108.

In one embodiment, the robot control module 408 is configured to inhibit operation of the robot 124 in response to the mix ratio being outside of a predetermined mix ratio range (e.g., a ratio between a lower value and an upper value). In some embodiments, the robot control module 408 operates the robot 124 in response to the mix ratio being within the predetermined mix ratio range. In various embodiments, the controller 126 delays operation of the robot 124 until the mix ratio is controlled to be within the predetermined mix ratio range. For example, the controller 126 is notified by the calculation module 406 that the mix ratio is outside of the predetermined mix ratio range in some implementations. According to some embodiments, the calculation module 406 determine a change to the quantity of the first material 106 and/or the second material 108 that will put the mix ratio within the predetermined mix ratio range. The controller 126 then controls the mixing module 402 to mix the first material 106 and the second material 108 based on the determined change.

Figure 5A:
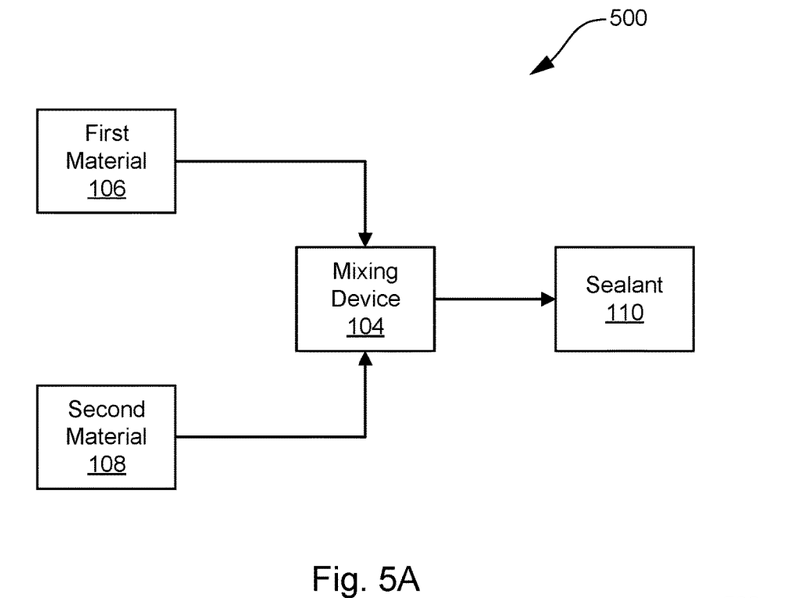
FIG. 5A is a schematic block diagram of one embodiment of a system for producing a sealant.

FIG. 5A is a schematic block diagram of one embodiment of a system 500 for producing the sealant 110. As illustrated, the first material 106 and the second material 108 are mixed by a mixing device 104 to produce the sealant 110.

Figure 5B:
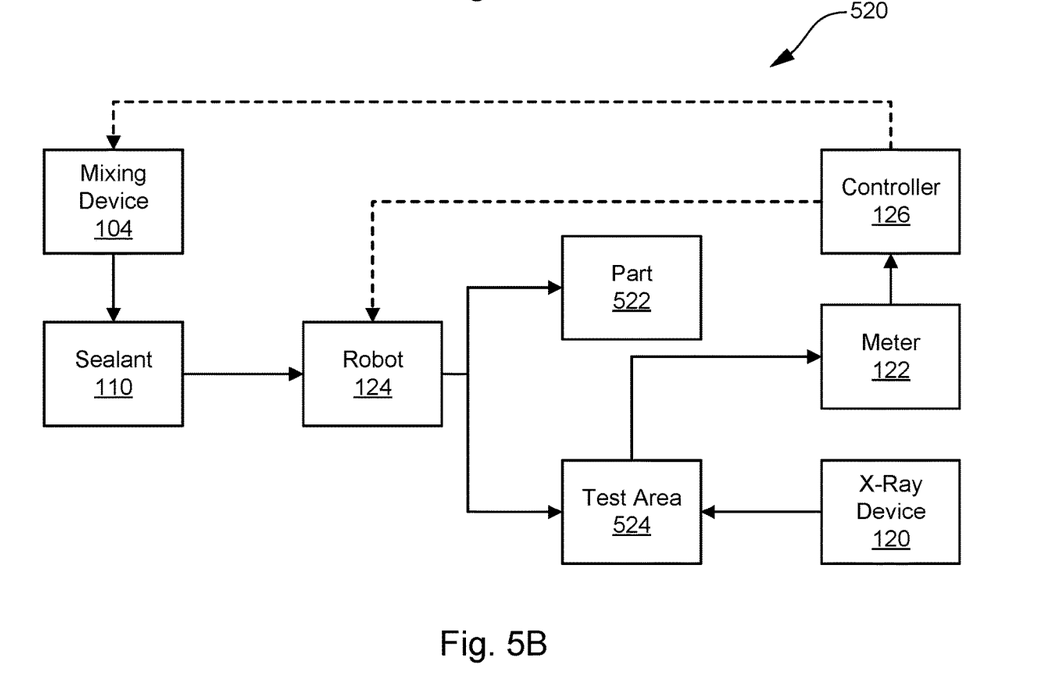
FIG. 5B is a schematic block diagram of one embodiment of system for testing a sealant.

FIG. 5B is a schematic block diagram of one embodiment of a system 520 for producing the sealant 110. As illustrated, the sealant 110 is provided to the robot 124. The robot 124 applies the sealant 110 to a part 522. In certain embodiments, the robot 124 applies the sealant 110 to the part 522 only after the mix ratio of the first and second materials of the sealant 110 has been tested. In some embodiments, the sealant 110 may be tested at a predetermined frequency, such as when there is a lot number change in the sealant 110, a predetermined volume of sealant 110 has been applied, a predetermined time has elapsed since the last test, and/or at the start of use for a day or shift. To test the sealant 110, the robot 124 applies the sealant 110 to a test area 524. For example, in one embodiment, the robot 124 applies the sealant 110 to a container (e.g., cup) in the test area 524. The x-ray device 120 applies x-ray energy to the sealant 110 being tested. The meter 122 measures an amount of fluorescence emitted from the sealant 110 being tested in response to the applied x-ray energy. The controller 126 calculates a mix ratio of the first and second materials of the sealant 110 based on the amount of fluorescence and determines whether the mix ratio is within a predetermined mix ratio range. If the mix ratio is within the predetermined mix ratio range, the controller 126 controls the robot 124 to apply the sealant 110 with the current mix ratio to the part 522. However, in one implementation, as indicated in dashed lines, if the mix ratio is not within the predetermined mix ratio range, the robot 124 is shut down while the controller 126 determines a new mix ratio and controls the mixing device 104 to mix the first and second materials 106 and 108 according to the new mix ratio. Once the new mix ratio is achieved, the controller 126 starts the robot 124 to apply the sealant with the new mix ratio. In some embodiments, the new mix ratio may be verified through testing using the x-ray device 120 before application. According to another implementation, as also indicated in dashed lines, if the mix ratio is not within the predetermined mix ratio range, the controller 126 keeps the robot 124 operating to apply the sealant 110 to the part, while concurrently determining a new mix ratio and controlling the mixing device 104 to mix the first and second materials 106 and 108 according to the new mix ratio for delivery to the robot 124. According to one embodiment, the predetermined mix ratio range is different for each of the alternative implementations presented immediately above in this paragraph. For example, the predetermined mix ratio range associated with shutting the robot 124 down while a new mix ratio is achieved can be a more extreme departure from a desired mix ratio than the predetermined mix ratio range associated with allowing the robot 124 to continuously operate while a new mix ratio is achieved.

Figure 5C:
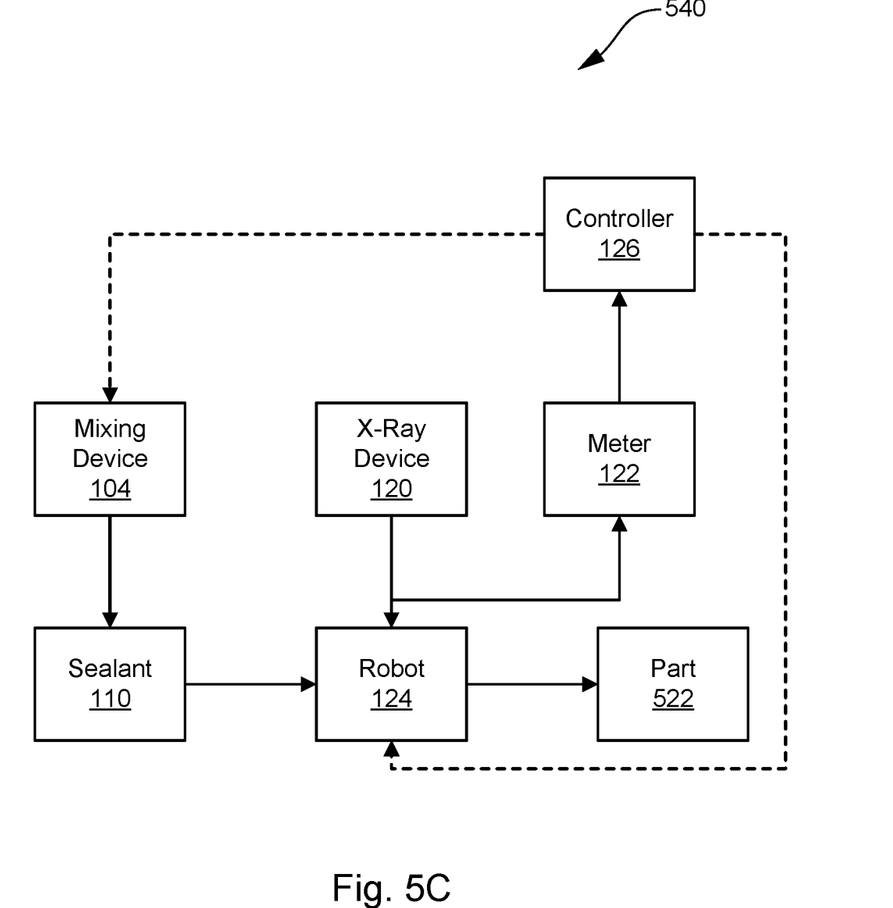
FIG. 5C is a schematic block diagram of another embodiment of a system for testing a sealant.

FIG. 5C is a schematic block diagram of another embodiment of a system 540 for testing the sealant 110. As illustrated, the sealant 110 is provided to the robot 124. The robot 124 applies the sealant 110 to the part 522. In certain embodiments, the robot 124 applies the sealant 110 to the part 522 only after the mix ratio of the first and second materials of the sealant 110 has been tested. To test the sealant 110, the x-ray device 120 applies x-ray energy to the sealant 110 as the sealant 110 is being directed out of the end effector 310 of the robot 124. In certain embodiments, the x-ray energy is applied to the sealant 110 within a portion of the robot 124 (e.g., prior to the sealant 110 exiting the end effector 310), while, in other embodiments, the x-ray energy is applied to the sealant 110 as, or shortly after, the sealant 110 exits the end effector 310 of the robot 124. The meter 122 measures an amount of fluorescence emitted from the sealant 110 being tested in response to the applied x-ray energy. The controller 126 calculates a mix ratio of the first and second materials of the sealant 110 based on the amount of fluorescence and determines whether the mix ratio is within a predetermined mix ratio range. If the mix ratio is within the predetermined mix ratio range, the robot 124 is operated to apply the sealant 110 to the part 522. However, in one implementation, as indicated in dashed lines, if the mix ratio is not within the predetermined mix ratio range, the robot 124 is shut down while the controller 126 determines a new mix ratio and controls the mixing device 104 to mix the first and second materials 106 and 108 according to the new mix ratio. Once the new mix ratio is achieved, the controller 126 starts the robot 124 to apply the sealant with the new mix ratio. In some embodiments, the new mix ratio may be verified through testing using the x-ray device 120 before application. According to another implementation, as also indicated in dashed lines, if the mix ratio is not within the predetermined mix ratio range, the controller 126 keeps the robot 124 operating to apply the sealant 110 to the part, while concurrently determining a new mix ratio and controlling the mixing device 104 to mix the first and second materials 106 and 108 according to the new mix ratio for deliver to the robot 124. According to one embodiment, the predetermined mix ratio range is different for each of the alternative implementations presented immediately above in this paragraph. For example, the predetermined mix ratio range associated with shutting the robot 124 down while a new mix ratio is achieved can be a more extreme departure from a desired mix ratio than the predetermined mix ratio range associated with allowing the robot 124 to continuously operate while a new mix ratio is achieved.

Figure 6:
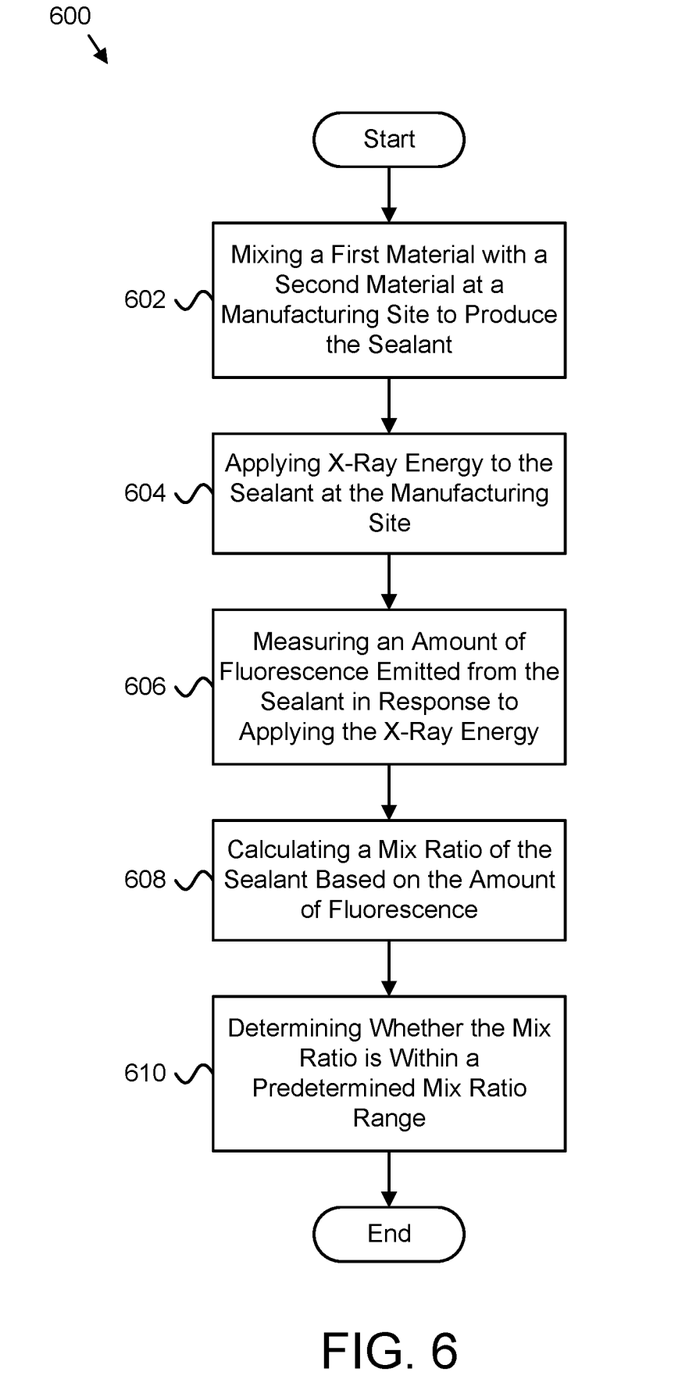
FIG. 6 is a schematic flow diagram of one embodiment of a method relating to a sealant.

FIG. 6 is a schematic flow diagram of one embodiment of a method 600 relating to the sealant 110. In one embodiment, the method 600 includes mixing 602 a first material (e.g., the first material 106) with a second material (e.g., the second material 108) at a manufacturing site to produce the sealant 110. In various embodiments, the first material includes a base, the second material includes an accelerator, and the accelerator includes a fluorescing compound, which can be made from a metal. In certain embodiments, the method 600 includes applying 604 x-ray energy to the sealant 110 at the manufacturing site. In one embodiment, the x-ray energy is applied to a separated portion of the sealant 110 (e.g., sealant 110 in a test area); while, in another embodiment, the x-ray energy is applied to an unseparated portion of the sealant 110 (e.g., sealant 110 tested in-line, sealant 110 tested as the sealant 110 is being applied, etc.). In some embodiments, the method 600 includes measuring 606 an amount of fluorescence emitted from the sealant 110 in response to applying the x-ray energy.

In various embodiments, the method 600 includes calculating 608 a mix ratio of the first and second materials of the sealant 110 based on the amount of fluorescence. In certain embodiments, calculating 608 the mix ratio of the first and second materials of the sealant 110 based on the amount of fluorescence includes calculating the mix ratio by comparing the amount of fluorescence to a calibration curve. In one embodiment, the method 600 includes determining 610 whether the mix ratio is within a predetermined mix ratio range. In one embodiment, the method 600 includes modifying operation of robotic application of the sealant in response to the mix ratio being outside the predetermined mix ratio range. Modifying operation of robotic application of the sealant may include inhibiting operation of robotic application of the sealant, stopping robotic application of the sealant, and/or continuing robotic application of the sealant (e.g., with a modified sealant). In some embodiments, the method 600 includes applying the sealant 110, using robotic application, to a part (e.g., the part 522) at the manufacturing site. In certain embodiments, the method 600 includes adjusting the mix ratio in response to the mix ratio being outside the predetermined mix ratio range.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Embodiments of the modules of the controller 126 may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

The modules of the controller 126 may be implemented as a hardware circuit comprising custom VLSI circuits or gate arrays, off-the-shelf semiconductors such as logic chips, transistors, or other discrete components. The modules of the controller 126 may also be implemented in programmable hardware devices such as field programmable gate arrays, programmable array logic, programmable logic devices or the like.

The modules of the controller 126 may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized by the modules of the controller 126. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present subject matter may be embodied in other specific forms without departing from its spirit or essential characteristics. The described embodiments are to be considered in all respects only as illustrative and not restrictive. All changes which come within the meaning and range of equivalency of the claims are to be embraced within their scope.

What is claimed is:

1. A method comprising:
   producing, on-site, a sealant at a manufacturing site of parts at which the sealant is applied to the parts during manufacture of the parts by mixing a first material with a second material at the manufacturing site;
   testing the sealant, in an uncured state, in a first testing area at the manufacturing site by:
      applying, at the manufacturing site, a first amount of x-ray energy to the sealant in the first testing area before the sealant is applied to a part,
      measuring, at the manufacturing site, a first amount of fluorescence emitted from the sealant in the first testing area before the sealant is applied to the part in response to applying the first amount of x-ray energy to the sealant in the first testing area, and
      calculating, at the manufacturing site, a mix ratio of the first and second materials of the sealant based on the first amount of fluorescence emitted from the sealant in the first testing area at the manufacturing site before the sealant is applied to the part, wherein:
         the mix ratio is calculated based on a comparison between the first amount of x-ray energy applied to the sealant in the first testing area and the measured first amount of fluorescence emitted from the sealant in the first testing area, and
         the calculation based on the comparison is performed at the manufacturing site;
   determining, in real-time at the manufacturing site, whether the mix ratio is within a predetermined mix ratio range before the sealant is applied to the part based on the comparison;
   in response to the mix ratio being within the predetermined mix ratio range, using a robotic application to apply the sealant to the part in real-time; and
   in response to the mix ratio being outside the predetermined mix ratio range:
      changing, in real-time at the manufacturing site, the mix ratio of the sealant to create a modified sealant by one of:
         turning ON a first pump supplying the first material to the sealant to increase an amount of the first material in the modified sealant, and
         turning ON a second pump supplying the second material to the sealant to increase an amount of the second material in the modified sealant,
      verifying that the modified sealant includes the predetermined mix ratio range via testing the modified sealant, in an uncured state, in a second testing area by:
         applying a second amount of x-ray energy to the modified sealant in the second testing area,
         measuring a second amount of fluorescence emitted from the modified sealant in the second testing area, and
         calculating a mix ratio of the first and second materials of the modified sealant based a comparison between the second amount of x-ray energy applied to the modified sealant in the second testing area and the measured second amount of fluorescence emitted from the modified sealant in the second testing area, and
      in response to verifying that the modified sealant in the second testing area includes the predetermined mix ratio range, using the robotic application to apply the modified sealant to the part in real-time.

2. The method of claim 1, further comprising applying the modified sealant, using the robotic application, to the part at the manufacturing site in response to creating the modified sealant.

3. The method of claim 2, wherein the first material comprises a base, the second material comprises an accelerator, and the accelerator comprises a fluorescing compound.

4. The method of claim 2, wherein calculating the mix ratio of the first and second materials of the sealant based on the first amount of fluorescence further comprises calculating the mix ratio by comparing the first amount of fluorescence to a calibration curve for the first material, the second material, or both the first and second materials.

5. The method of claim 2, further comprising modifying operation of the robotic application of the sealant in response to the mix ratio being outside the predetermined mix ratio range.

6. The method of claim 1, wherein the first material comprises a base, the second material comprises an accelerator, and the accelerator comprises a fluorescing compound.

7. The method of claim 1, wherein calculating the mix ratio of the first and second materials of the sealant based on the first amount of fluorescence further comprises calculating the mix ratio by comparing the first amount of fluorescence to a calibration curve for the first material, the second material, or both the first and second materials.

8. The method of claim 7, wherein calculating the mix ratio by comparing the first amount of fluorescence to the calibration curve comprises comparing in real-time the first amount of fluorescence to the calibration curve for the first material, the second material, or both the first and second materials before the sealant is applied to the part.

9. The method of claim 1, further comprising modifying operation of the robotic application of the sealant in response to the mix ratio being outside the predetermined mix ratio range.

10. The method of claim 9, wherein modifying operation of robotic application of the sealant in response to the mix ratio being outside the predetermined mix ratio range comprises modifying in real-time operation of robotic application of the sealant before the sealant is applied to the part.

11. The method of claim 1, wherein:
changing, in real-time, the mix ratio of the sealant to create the modified sealant comprises adjusting the mix ratio of the sealant in real-time by adding one of the first material and the second material to the sealant so that an adjusted mix ratio of the modified sealant is within the predetermined mix ratio range before the modified sealant is applied to the part; and
the method further comprises applying the modified sealant with the adjusted mix ratio to the part.

12. The method of claim 1, wherein calculating the mix ratio of the first and second materials of the sealant based on the first amount of fluorescence comprises using a fluorometer to measure the first amount of fluorescence of the mix ratio of the first and second materials of the sealant in real-time before the sealant is applied to the part.

13. The method of claim 12, wherein calculating the mix ratio of the first and second materials of the sealant further comprises calculating the mix ratio by comparing the first amount of fluorescence of the mix ratio of the first and second materials to a calibration curve for the first material, the second material, or both the first and second materials.

14. The method of claim 13, wherein calculating the mix ratio by comparing the first amount of fluorescence to the calibration curve comprises comparing in real-time the first amount of fluorescence to the calibration curve for the first material, the second material, or both the first and second materials before the sealant is applied to the part.

15. A method comprising:
producing a first sealant with a first mix ratio of a first material and a second material by mixing the first material and the second material on-site at a manufacturing site of parts at which the sealant is applied to parts during manufacture of the parts;
applying a first amount of x-ray energy to the first sealant, in an uncured state, in a first testing area;
measuring a first amount of fluorescence emitted from the first sealant in the first testing area to determine whether the first mix ratio is within a predetermined mix ratio range;
in response to determining that the first mix ratio is within the predetermined mix ratio range, applying the first sealant to a part using a robotic application; and
in response to determining that the first mix ratio is outside the predetermined mix ratio range:
adjusting the first mix ratio in real-time at the manufacturing site to produce a second sealant with a second mix ratio by:
turning ON a first pump to supply additional first material to the first sealant to produce the second sealant,
turning ON a second pump to supply additional second material to the first sealant to produce the second sealant, or
turning ON the first pump and the second pump to supply additional first material and second material to the first sealant to produce the second sealant,
verifying that the second sealant includes the predetermined mix ratio range in a second testing area, and
in response to verifying that the modified sealant in the second testing area includes the predetermined mix ratio range, applying the modified sealant to the part using the robotic application.

16. The method of claim 15, wherein the first material comprises a base, the second material comprises an accelerator, and the accelerator comprises a fluorescing compound.

17. The method of claim 15, further comprising calculating the first mix ratio of the first and second materials of the sealant based on the first amount of fluorescence by comparing the first amount of fluorescence to a calibration curve for the first material, the second material, or both the first and second materials.

18. The method of claim 15, further comprising modifying operation of the robotic application of the first sealant in response to the mix ratio being outside the predetermined mix ratio range.

19. The method of claim 18, wherein modifying operation of robotic application of the first sealant in response to the mix ratio being outside the predetermined mix ratio range comprises modifying in real-time operation of robotic application of the first sealant before the first sealant is applied to the part.

20. The method of claim 15, wherein measuring a first amount of fluorescence emitted from the first sealant comprises using a fluorometer to measure the first amount of fluorescence of the first sealant.

* * * * *